US012678906B2

(12) United States Patent (10) Patent No.: US 12,678,906 B2
Inagaki et al. (45) Date of Patent: Jul. 14, 2026

(54) MACHINE TOOL SYSTEM, AND HYDRAULIC LIQUID AND PROCESSING LIQUID FOR MACHINE TOOLS

(71) Applicant: Nihon Fluid System Inc., Takarazuka (JP)

(72) Inventors: Hidekazu Inagaki, Ikoma (JP); Koji Hachisuka, Nishio (JP); Nobuyuki Shimizu, Takarazuka (JP); Koji Sato, Tokyo (JP)

(73) Assignee: Nihon Fluid System Inc., Takarazuka (JP)

( * ) Notice: Subject to any disclaimer, the term of this patent is extended or adjusted under 35 U.S.C. 154(b) by 84 days.

(21) Appl. No.: 18/844,068

(22) PCT Filed: Mar. 6, 2023

(86) PCT No.: PCT/JP2023/008254
§ 371 (c)(1),
(2) Date: Sep. 5, 2024

(87) PCT Pub. No.: WO2023/171601
PCT Pub. Date: Sep. 14, 2023

(65) Prior Publication Data
US 2025/0178145 A1    Jun. 5, 2025

(30) Foreign Application Priority Data

Mar. 8, 2022    (JP) ................................. 2022-035023

(51) Int. Cl.
*B23Q 11/10*        (2006.01)
*C10M 169/04*      (2006.01)
*C10N 20/00*        (2006.01)

(52) U.S. Cl.
CPC ....... *B23Q 11/1038* (2013.01); *C10M 169/04* (2013.01); *C10N 2020/091* (2020.05)

(58) Field of Classification Search
CPC .... C10M 173/02; C10M 169/04; Y02P 70/10; C10N 2020/091; B23Q 11/1084; B23Q 11/1038; B23Q 11/10
See application file for complete search history.

(56) References Cited

FOREIGN PATENT DOCUMENTS

| | | |
|---|---|---|
| JP | 62252498 A | 11/1987 |
| JP | 0559382 A | 3/1993 |
| JP | 2000239686 A | 9/2000 |

(Continued)

*Primary Examiner* — Vishal V Vasisth
(74) *Attorney, Agent, or Firm* — NKL Law; Jae Youn Kim

(57) ABSTRACT

Provided is a machining tool system configured to be utilized in an environment in which a hydraulic fluid and a processing fluid are mixed, in which a water-soluble material that does not contain an oil-soluble materials derived from a mineral is used for the hydraulic fluid and the processing fluid (collectively, the "fluids"). The machining tool system includes: collecting means for collecting the fluids after a lubricating effect ends while being mixed, the collecting means being disposed downstream of a lubricating flow path of the machining tool; a discharging container communicating with the collecting means and storing the fluids; and circulating means for suctioning the fluids inside the discharging container without separation into oil and water from an inlet port in the discharging container at a position separated from a bottom portion and returning the fluids to a supply flow path of the processing fluid and/or the hydraulic fluid.

7 Claims, 5 Drawing Sheets

(56)     References Cited

FOREIGN PATENT DOCUMENTS

| JP | 2002167594 A | 6/2002 |
|----|--------------|--------|
| JP | 2008-221397 A | 9/2008 |
| JP | 2010-23154 A | 2/2010 |
| JP | 2011115911 A | 6/2011 |
| JP | 2012-91265 A | 5/2012 |
| JP | 2019002894 A | 1/2019 |
| JP | 2019504158 A | 2/2019 |

MACHINE TOOL SYSTEM, AND HYDRAULIC LIQUID AND PROCESSING LIQUID FOR MACHINE TOOLS

This application is a 371 of PCT/JP2023/008254 filed Mar. 6, 2023.

TECHNICAL FIELD

The present invention relates to a machining tool system that uses and recycles a lubricating fluid for a machining tool that does not contain oil-soluble materials derived from mineral oils, and a hydraulic fluid and a processing fluid for machining tools.

BACKGROUND ART

Lubricating oils as a variety of hydraulic oils have been used for movable portions of machining tools that are used to process metal materials. Conventionally, oil-soluble lubricants containing mineral oils, fatty acid esters, and the like as base oils have been used in lubricating oils as such hydraulic oils from the viewpoint of lubricity. Also, additives including chlorine, sulfur, phosphorus, and the like are blended for the purpose of improving the lubricating performance in many cases.

However, the lubricating oils as the hydraulic oils and additives are consumed with operations of the machining tools, and most parts thereof are mixed in collection tanks for processing oils (processing fluids) such as cutting oils used for tools, processed members, and the like at the time of processing metal. The hydraulic oils in the collection tanks mixed with the cutting oils and the like have various adverse influences such as degradation of performance of the cutting oils and the like (details will be described later).

On the other hand, water-soluble lubricants have been used for processing oils such as cutting oils and the like from the viewpoint of environmental loads at the time of discarding, prevention of fire, prevention of corruption, and the like (similar to problems (i) to (vi) of the hydraulic oils, which will be described later) in recent years, and there has been a social demand for a further increase in utilization (see Patent Literatures 1 to 4). However, even when water-soluble processing oils (processing fluids (hereinafter, referred to as "cutting fluids" and "processing fluids" to distinguish them from oil-soluble agents)) are employed for cutting oils or the like, hydraulic oils (hydraulic fluid (hereinafter, also referred to as "hydraulic fluid" and "lubricating fluid" to distinguish them from oil-soluble agents)) are mixed with processing fluids in the collection tanks as described above if hydraulic oils of oil-soluble agents are used, and advantages achieved by employing the water soluble fluids are lost, or different measures are needed under the current situation.

Hereinafter, problems of the hydraulic fluids containing oil-soluble agents as base oils will be specifically listed below.

Problems of Lubricating Fluids Containing Oil-Soluble Material (i) If a hydraulic fluid is mixed with a cutting oil or the like containing an oil-soluble material as a base (base oil), bacteria increase with elapse of time, which leads to corruption and bad odor accompanying the corruption.

(ii) The oil-soluble material as the base of the hydraulic fluid, the additives, and the increasing bacteria may cause chapped hand skin of an operator due to irritation thereof, and an antiseptic agent blended for the purpose of reducing an increase in bacteria also contains factor substances of occurrence of the chapped hand skin, such as chlorine, sulfur, and phosphorus.

Problems Occurring When Hydraulic Fluid Containing Oil-Soluble Material Is Mixed With Processing Fluid of Water-Soluble Material (iii) If a hydraulic fluid containing an oil-soluble material is mixed with a processing fluid, influences (such as peeling of coating and shortage of adhesion) on later processes due to stickiness of a processed article are large, and conversely, washing of the processed article to avoid the influences includes problems such as degradation of a washing fluid and discarding of the washing fluid.

(iv) In a state where a hydraulic fluid containing an oil-soluble material has been mixed with a processing fluid and the two fluids, namely oil and water have not been separated, there is no other way but to discard the processing fluid after use even if the processing fluid itself is water-soluble, and the processing fluid cannot be reused and is thus for so-called single use. In a case of a large-scaled plant, in particular, a large amount of waste is generated, and it is necessary to respond to a social demand to aim for a decarbonized society. On the other hand, although there are also a method of introducing a device/process to finely separate the two fluids, namely oil and water and a method of controlling the amount of ejected hydraulic fluid to prevent mixing of the hydraulic fluid into the processing fluid and reducing the hydraulic fluid leaking into the collecting tank, the cost for introducing the device/process for two-fluid separation and the cost for employing the hydraulic fluid that exhibits a lubricating effect with a small amount of ejection increase.

(v) Even if a processing fluid of a water-soluble material is employed, it is not possible to avoid degradation of performance of the processing fluid with time when a small amount of hydraulic fluid containing an oil-soluble material is mixed in regardless of a measure such as two-fluid separation or limiting of the amount of ejection as described above, and a problem of processing of the waste fluid due to quick change thus remains.

(vi) Even if a processing fluid of a water-soluble material is employed, it is not possible to reuse both the processing fluid and a hydraulic fluid when the hydraulic fluid is still an oil-soluble material, and it is not possible to follow the social demand for reducing, reusing, and recycling materials in total.

In particular, when a large amount of processing fluid is released to a workpiece and a tool, a hydraulic fluid applied to the sliding portion of a machining tool in the vicinity of a processing portion is likely to mix therewith at the sliding portion, and the problem of mixing of the hydraulic fluid with the processing fluid is serious, which particularly requires attention.

CITATION LIST

Patent Literature

Patent Literature 1: Japanese Patent Laid-Open No. 2002-167594

Patent Literature 2: Japanese Patent Laid-Open No. 2008-221397

Patent Literature 3: Japanese Patent Laid-Open No. 2010-23154

Patent Literature 4: Japanese Patent Laid-Open No. 2012-91265

SUMMARY OF INVENTION

Technical Problem

The present invention was made in view of the above problems, and an object thereof is to provide a machining tool system capable of solving the above various problems by using a water-soluble lubricating fluid as a hydraulic fluid for a machining tool and circulating the hydraulic fluid and a processing fluid such as a cutting fluid inside the machining tool while maintaining lubricity of the fluids, and a lubricating fluid used for the machining tool system.

Solution to Problem

The present invention provides a machining tool system that utilizes a machining tool operating in an environment in which a hydraulic fluid (working fluid (mainly, a spindle hydraulic fluid, a sliding surface lubricating fluid)) and a processing fluid (cutting fluid (a cutting processing fluid, a grinding processing fluid, a polishing processing fluid, a plastic processing fluid, and the like (including oil-based and water-soluble fluids))) to be used to process a processed member with the machining tool are mixed, in which a lubricating fluid (lubrication fluid) of a water-soluble material that does not contain an oil-soluble material derived from a mineral is used for both the hydraulic fluid and the processing fluid, the machining tool system including: collecting means for collecting the hydraulic fluid and the processing fluid after a lubricating effect ends in a mixed manner, the collecting means being disposed downstream of a lubricating flow path of the machining tool; a discharging container that communicates with the collecting means and stores the hydraulic fluid and the processing fluid; and circulating means for directly suctioning the hydraulic fluid and the processing fluid inside the discharging container without separation into oil and water from an inlet port disposed in the discharging container at a position separated from a bottom portion and returning the hydraulic fluid and the processing fluid to a supply flow path of the processing fluid and/or the hydraulic fluid.

In the machining tool system according to the present invention, not only the processing fluid but also the hydraulic fluid do not contain oil-soluble materials derived from mineral oils, the common lubricating fluid of the water-soluble material is used for both the processing fluid and the hydraulic fluid, the hydraulic fluid and the processing fluid after use (after the lubricating effect ends) are collected and stored in the discharging container (for example, a storage tank), and the stored lubricating fluid is circulated again as it is to the supply side. Therefore, since no oil-soluble materials are used in the flow path (fluid path) of the machining tool in the first place, the water-soluble material is used, and the hydraulic fluid and the processing fluid are thus completely dissolved and mixed and are soluble at the time of the collection, the problems such as (i) to (vi) described above do not occur when a hydraulic fluid containing an oil-soluble material is mixed with a processing fluid such as a cutting fluid without performing two-fluid separation (for example, suctioning of a stored fluid while avoiding the vicinity of a fluid surface, which will be described later, in the embodiment).

Specifically, (i)(ii) there are no oil-soluble materials that may be nutrient sources, an increase in bacteria is reduced, and it is also possible to reduce occurrence of an anaerobic state (anaerobic bacteria) caused by an oil-soluble material separation-floating or emulsification-floating and covering the fluid surface because the fluids are the water-soluble material. As a result, it is possible to reduce corruption and bad odor. Moreover, it is also possible to prevent chapped hands since no oil-soluble materials are contained. Also, (iii) stickiness and contamination of a processed article due to adhesion of an oil-soluble material to the processed article do not occur, a washing process after processing is not needed or becomes easy, and it is possible to aim for reduction of a washing fluid, reduction of waste fluid by suppressing degradation of the washing fluid, and shortening of the entire processing process (reducing of manufacturing cost). Furthermore, (iv)(v)(vi) an increase in cost that may accompany the limiting of the amount of ejected hydraulic fluid or installation of a two-fluid separating device and an increase in size and complication of a structure of the machining tool are prevented, and it is possible to achieve a requirement of reusing the fluids by commonly using a fluid both as the processing fluid and as the hydraulic fluid without degradation of performance of the processing fluid with time due to mixture of a small amount of hydraulic fluid and without quick change.

Preferably, the supply flow path through which the circulating means returns the hydraulic fluid and the processing fluid from inside of the discharging container is a supply flow path for the processing fluid and blocks communication with a supply flow path for the hydraulic oil.

In the present preferred machining tool system, the hydraulic fluid and the processing fluid collected by the circulating means are returned only to the supply flow path for the processing fluid (such as a cutting fluid), are utilized again as the processing fluid, and are not returned to the supply flow path for the hydraulic fluid, and for the hydraulic fluid a flow path through which a new hydraulic fluid is always supplied is formed. In a case where a water-soluble material is employed for the hydraulic fluid, water content evaporation occurs in the process of use on a sliding surface, a requirement for performance such as viscosity thereof as a lubricating fluid is strict, and it is thus necessary to adjust components of the collected fluids and to reuse the fluids. On the other hand, the processing fluid such as a cutting fluid is sludge (chips and the like) which is fine particles, it is not possible to completely filter the fine particles and to avoid mixing thereof, and utilization of the fluid with the sludge mixed therein as the hydraulic fluid may cause damage on the sliding surface, which is problematic particularly for a machining tool that performs processing with high precision. Moreover, a major issue for the processing fluid is to secure the amount of fluid to be utilized, and it is known that even in the case of the water-soluble processing fluid, it is possible to reuse the processing fluid merely by collecting the processing fluid after use and the hydraulic fluid of the same type as they are without any distinction therebetween and executing uniform water addition or the like as refilling corresponding to the evaporated water content, which has originally been performed, without any change because a requirement for performance of the processing fluid is not as strict as that of the hydraulic fluid. Therefore, the present preferred machining tool system adopts a configuration in which even in a case where the water-soluble material is used both as the hydraulic fluid and as the processing fluid, entrance of the hydraulic fluid after use to the flow path on the side of the processing fluid is actively permitted, a circulating flow path is formed as it is, and the processing fluid and the hydraulic fluid after use are not allowed to enter the flow path on the side of the hydraulic fluid to avoid backflow, in order to aim for simplification of component control that is being utilized, cost reduction, and market expansion.

Also, the present machining tool system can be applied to a machining tool that has all the functions including, for processing of the processed member, a lathe function, a milling function, a grinding function, a drilling function, and a saw cutting function.

Also, a hydraulic fluid and a processing fluid for machining tools that are used for the above machining tool system, contain a water-soluble material, and do not contain oil-soluble materials do not contain antiseptic agents, and pH buffer agents are blended in the hydraulic fluid and the processing fluid.

For the hydraulic fluid and the processing fluid as lubricating fluids used for the above machining tool system, the water-soluble material is used as a base, and in addition, no antiseptic agents (for the purpose of reducing an increase in bacteria) such as chlorine, sulfur, and phosphorus as in a base oil derived from a mineral oil are not blended therein, and an alkaline agent that promotes an antiseptic effect by maintaining pH of the water-soluble material is blended therein. Therefore, if the present hydraulic fluid and processing fluid are employed, it is not only possible to reduce (i) bad odor due to an increase in bacteria but it is also advantageous in preventing (ii) chapped hands of an operator due to chlorine, sulfur, phosphorus, and the like contained in an antiseptic agent of the conventional lubricating fluid of the oil-soluble material.

Advantageous Effect of Invention

According to the machining tool system and the hydraulic fluid and the processing fluid for machining tools of the present invention, it is possible to recycle a processing fluid inside a machining tool without separating two fluids, namely oil and water, by not containing oil-soluble materials derived from mineral oils in a hydraulic fluid for the machining tool and using water-soluble fluids as both the hydraulic fluid and the processing fluid.

DESCRIPTION OF EMBODIMENT

Figure 1:
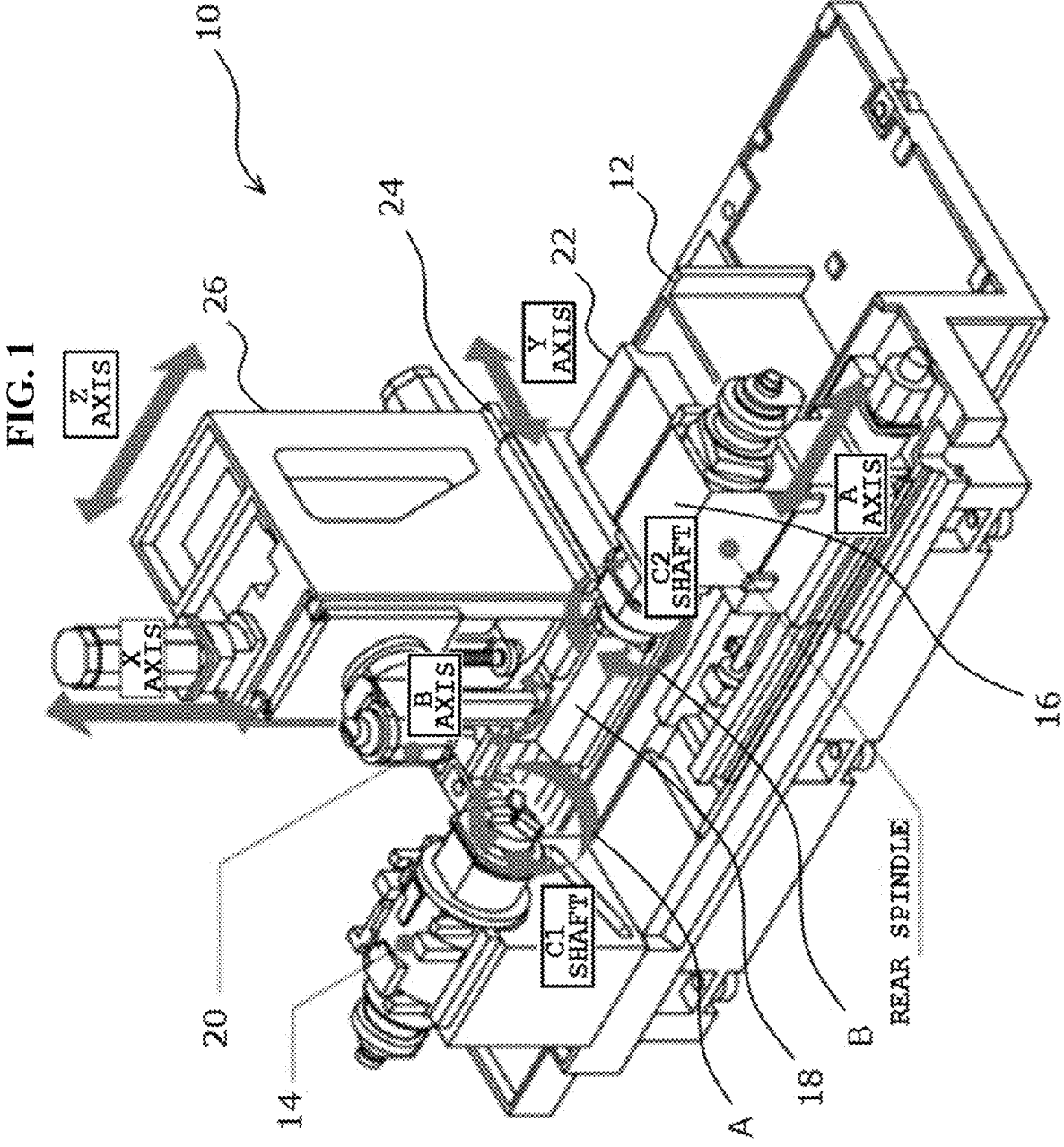
FIG. 1 is a perspective view of an NC lathe machine as an example of a machining tool that employs a machining tool system according to the present invention.
Figure 4:
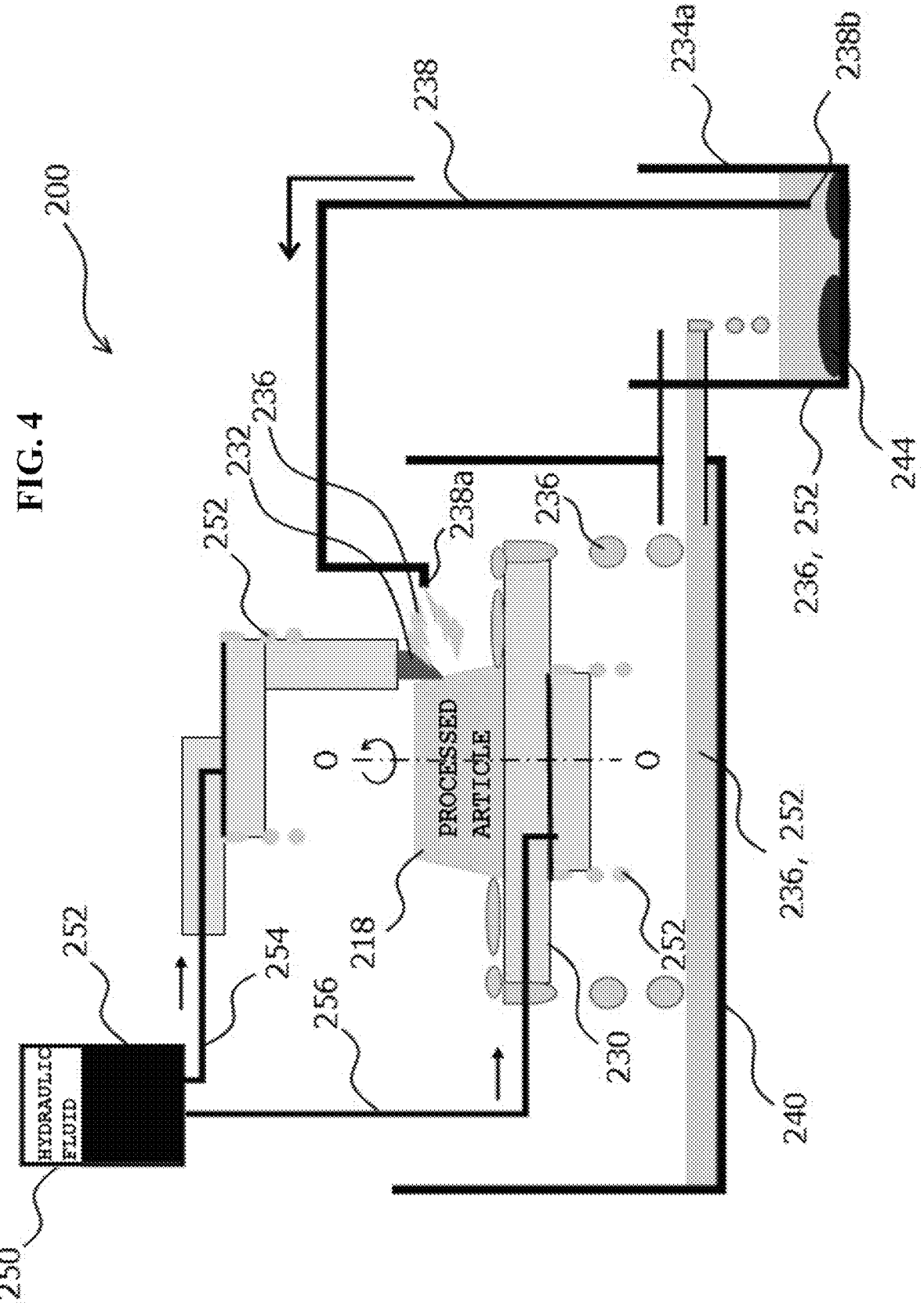
FIG. 4 is a schematic view illustrating a flow path configuration example of a hydraulic fluid and a processing fluid in the machining tool system according to the present invention.

Hereinafter, an embodiment of a machining tool system according to the present invention will be described as an example. The present machining tool system can be applied to various machining tools such as a cutting processing device and grinding processing device that use hydraulic fluids used for sliding surfaces and the like and processing fluids used for processed parts of workpieces. In the present specification, an NC lathe machine is illustrated in FIG. 1 as an example of a machining tool that employs the present machining tool system, and particularly, a perspective view of a horizontal NC lathe machine with a spindle (a rotation shaft of a workpiece) horizontally disposed is illustrated as an example of the NC lathe machine. Also, FIGS. 2 and 4 illustrate schematic views of vertical NC lathe machines that are typically used for large-scaled lathe processing as other examples of the NC lathe machine illustrated in FIG. 1, and further, FIG. 2 illustrates a configuration example of a machining tool system in the related art using the vertical NC lathe machine, while FIG. 4 illustrates a configuration example of the present machining tool system using the same vertical NC lathe machine.

As illustrated in FIG. 1, two spindles (a C1 shaft 14 and a C2 shaft 16) are disposed in a separated manner on a mount 12 such that axes thereof (the longitudinal direction of the devices (Z-axis direction)) are the same or parallel to each other in a general-purpose horizontal NC lathe machine 10. Both the C1 shaft 14 and the C2 shaft 16 axially rotate as illustrated by the arrows A and B with a workpiece 18 attached thereto. Also, a lower bed 22 is attached to the mount 12, and an upper bed 24 adapted to slide in the Z-axis direction relative to the lower bed 22 is attached to the lower bed 22. A spindle base 26 adapted to slide in a Y-axis direction relative to the upper bed 24 is attached to the upper bed 24. A tool spindle 20 adapted to move up and down in an X-axis direction relative to the spindle base 26 is attached to the spindle base 26, and a tool is chucked at a distal end of the tool spindle 20 (not illustrated). With such a configuration, a cutting edge of the tool approaches a desired position of the axially rotating workpiece 18, separates therefrom, and performs cutting processing on the workpiece 18 in the perspective view of the horizontal NC lathe machine 10.

Figure 2:
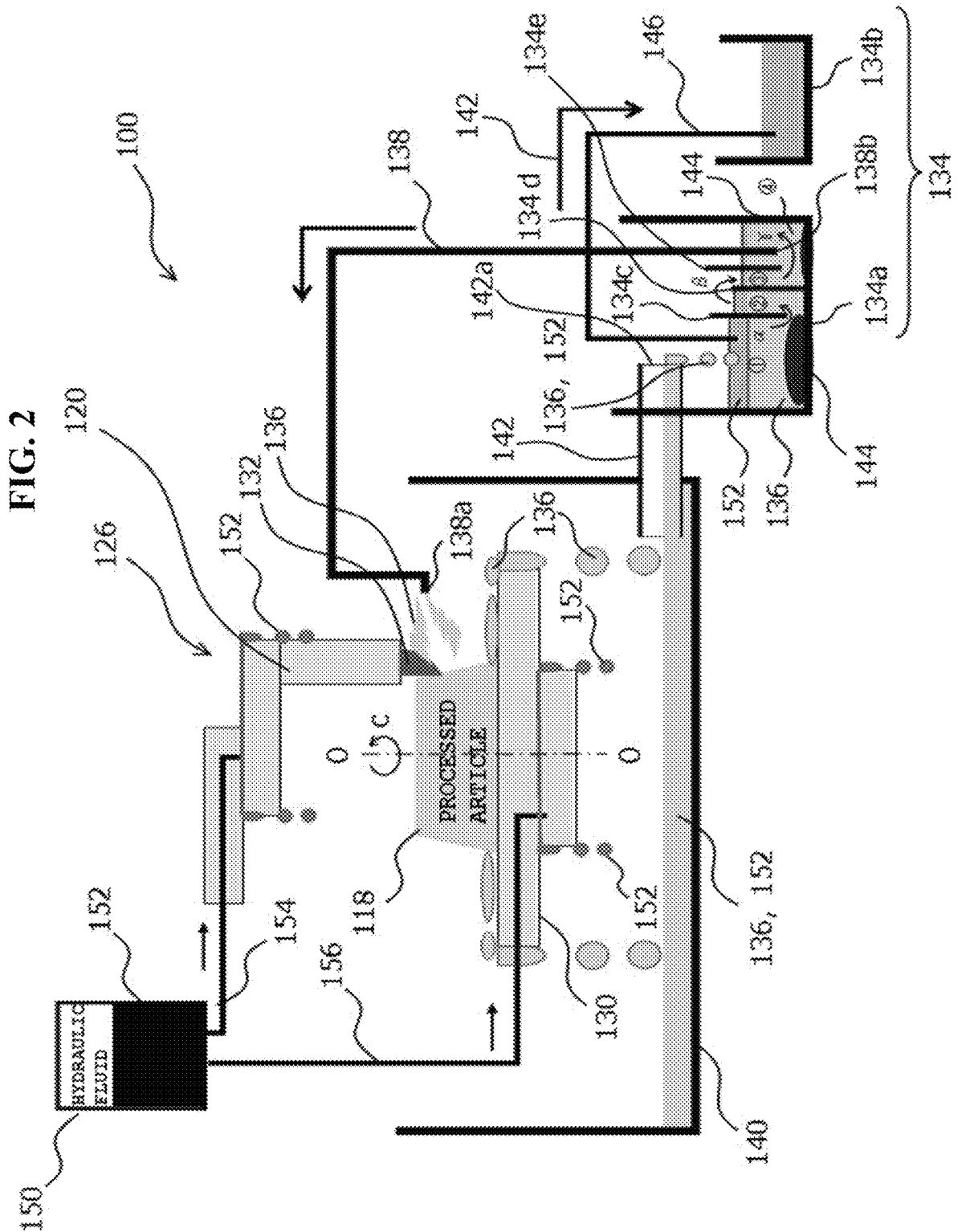
FIG. 2 is a schematic view illustrating a flow path configuration example of a hydraulic fluid and a processing fluid in a conventional machining tool system.
Figure 3:
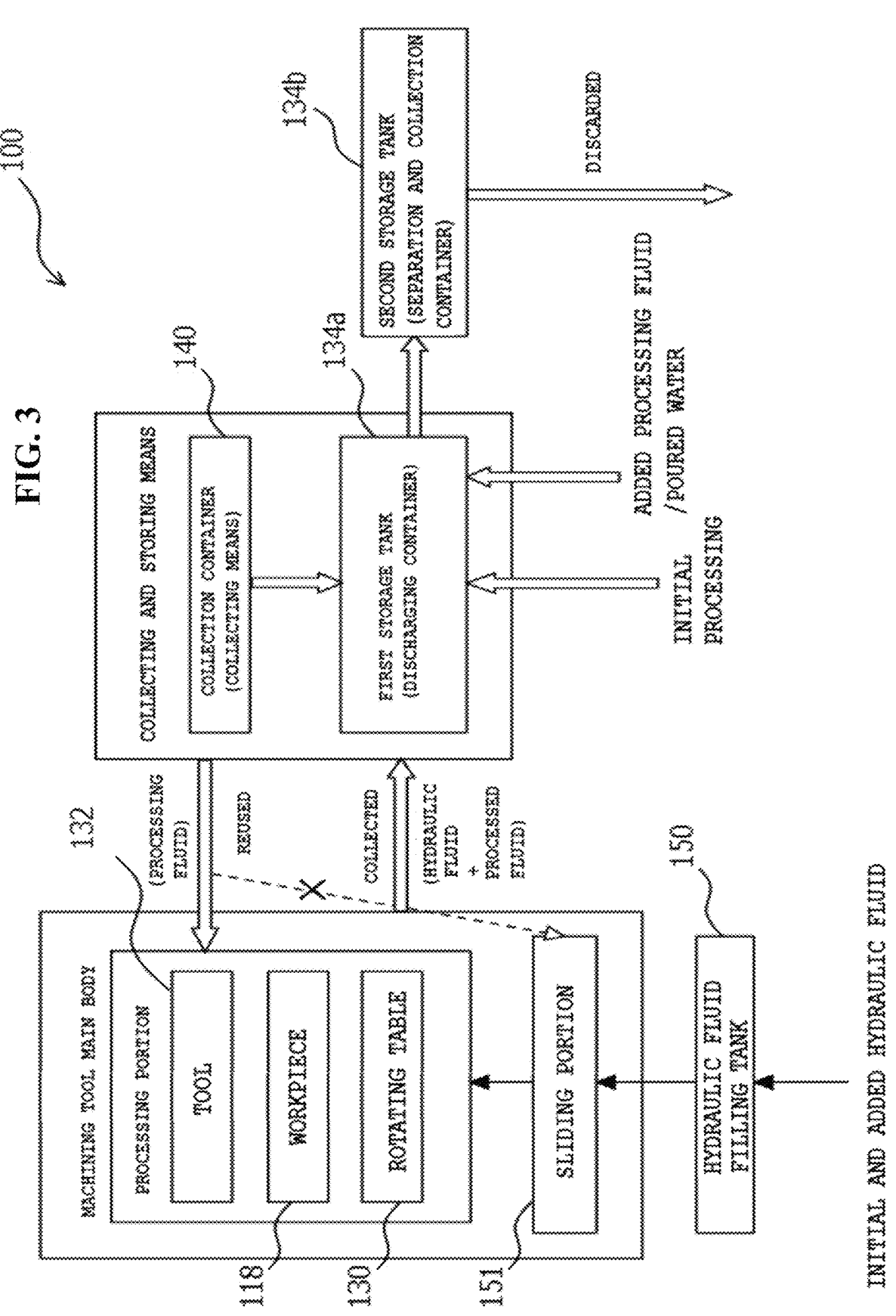
FIG. 3 is a block diagram illustrating a configuration example of the conventional machining tool system in FIG. 2.

As described above, FIG. 2 illustrates a configuration example of the machining tool system in the related art using a vertical NC lathe machine 100, and FIG. 3 illustrates a configuration example of the present machining tool system using the same vertical NC lathe machine 100 as that in FIG. 2. Note that in FIGS. 2 and 3, members with reference signs, the last two numbers of which are the same as those in FIG. 1, means members of the same types. The vertical NC lathe machine 100 is a lathe machine of a model in which a workpiece is set on a rotating table with a rotation shaft in a vertical direction like a pottery wheel and lathe processing is performed thereon, and the vertical NC lathe machine 100 is suitable for processing of a workpiece with a large size (diameter). Specifically, a rotating table 130 carrying a workpiece 118 rotates about an axis O-O, and a tool spindle 120 of a spindle base 26 approaches the rotating workpiece 118, separates from the workpiece 118, and cuts the workpiece 118 with a tool 132 grasped at the distal end thereof.

Example of Machining Tool System in Related Art
(See FIGS. 2 and 3)

Next, supply flow paths of lubricating fluids in the machining tool system in the related art using the vertical NC lathe machine 100 (hereinafter, also simply referred to as an "NC lathe machine 100") will be described with reference to FIGS. 2 and 3. FIG. 2 illustrates a configuration example of the machining tool system in the related art using the NC lathe machine 100, and FIG. 3 illustrates a block diagram illustrating an overview of the machining tool system in the related art illustrated in FIG. 2. Note that here, an example in which, from among lubricating fluids, a base of a processing fluid (cutting fluid) used at the time of processing of the workpiece 118 with the tool 132 is a water-soluble material and a base of a hydraulic fluid used for a sliding motion of the tool spindle 120 and lubrication of the sliding surface of the rotation shaft of the rotating table 130 is an oil-soluble material derived from a mineral oil will be described as the NC lathe machine 100 in the related art. Also, the arrows illustrated in FIG. 3 illustrate flows of the processing fluid or the hydraulic fluid, and the thicknesses of the arrows reflects images of how large the flow amounts are.

The NC lathe machine 100 includes a storage tank 134 configured of a first storage tank (discharging container) 134a and a second storage tank 134b provided together inside or outside the NC lathe machine 100.

First, as for the "processing fluid", a predetermined amount of new processing fluid 136 is poured into and stored in the first storage tank (discharging container) 134a before operation in an initial state (structures of the first storage tank 134a and the second storage tank 134b will be described later). Once the NC lathe machine 100 operates, the processing fluid 136 stored in the first storage tank 134a is pumped up with a pump (not illustrated), is transported to the side of a machining tool main body through inside of a suctioning flow path 138, and is then released from a releasing port 138a to a processed part in the vicinity of the workpiece 118 and the tool 132. The released processing fluid 136 performs lubrication and cooling of the processed part, then drops from the workpiece 118, the rotating table 130, and peripheral members to which the processing fluid have spattered, and is collected in a collection container (collecting means (a so-called oil pan, for example)) 140 adapted to receive all the released processing fluid.

The processing fluid after use collected in the collection container 140 is discharged from a discharge port 142a to the inside of the first storage tank 134a via a discharge flow path 142 disposed downstream of the collection container 140. Note that although the processing fluid inside the collection container 140 is transported to the first storage tank 134a via the discharge flow path 142 in FIG. 2, another flow path configuration may also be adopted as long as the processing fluid in the collection container 140 is discharged to the first storage tank 134a and the first storage tank 134a integrally functions as a collection and storage tank (see FIG. 3), and for example, there may be a case where the collection container 140 and the first storage tank 134a are directly connected to each other, a case where the processing fluid is pumped up from the collection container 140 once and is then transported to the inside of the first storage tank 134a, and the like. Note that the processing fluid in the collection container 140 contains sludge (sediment such as chips) 144 generated at the time of processing, and sludge 144 is precipitated at a bottom portion in the processing fluid after use stored in the first storage tank 134a.

Then, the processing fluid stored in the first storage tank 134a forms a circulating flow path through which the processing fluid is pumped up to the inside of the suctioning flow path 138 from a suctioning port 138b located at a predetermined height where the sludge 144 precipitated at the bottom portion is not pumped up and the pumped processing fluid is reused as a processing fluid (the second storage tank 134b and the like will be described later). With the circulating flow path, once the "processing fluid" is poured into the first storage tank 134a in the initial state, then processing fluid can be reused again and again except for cases of addition corresponding to the amount of decrease and regular maintenance as is obvious from FIG. 3, and useless "processing fluid" wasting processing is not needed.

Next, as for the "hydraulic fluid", the hydraulic fluid used in the machining tool system in the related art contains, as a main component, an oil-soluble material irrespective of the component of the processing fluid, a hydraulic fluid filling tank 150 is filled with a new hydraulic fluid 152 in an initial state, and refilling is then appropriately performed by a small amount corresponding to the amount of decrease. The hydraulic fluid 152 in the hydraulic fluid filling tank 150 is roughly split into a first hydraulic fluid supply path 154 on the side of the tool spindle 120 and a second hydraulic fluid supply path 154 on the side of the rotating table 130 and is supplied to the tool spindle 120 and a sliding portion 151 for sliding motion of the rotating table 130, respectively (see FIG. 3). Although the hydraulic fluid is supplied for the purpose of lubrication of the sliding portion 151, and the hydraulic fluid is not released in a large amount like the aforementioned processing fluid, a minute amount of hydraulic fluid is caused to leak to the outside of the tool spindle 120 and the sliding surface of the rotating table 130. The leaking hydraulic fluid 152 drops downward from the tool spindle 126, the tool 132, rotating table 130, and the like, and the most part thereof reaches the collection container 140 disposed to collect the processing fluid 136 (since there may be an example in which the collection container 140 and the first storage tank 134a are an integrated member, FIG. 3 is illustrated to express that the most part thereof reaches the entire collection and storage means). As a result, the fluid in the collection container 140 is brought into a state where the hydraulic fluid 152 of the oil-soluble component is mixed in the processing fluid 136 of the water-soluble component, and reaches the first storage tank 134a via the discharge flow path 142.

Although the first storage tank 134a is for the purpose of storing and reusing the processing fluid 136 as described above, the processing fluid 136 with the hydraulic fluid 152 mixed therewith is stored therein in practice. The mixture fluid of the processing fluid 136 and the hydraulic fluid 152 stored in the first storage tank 134a is in a state where the hydraulic fluid 152 of the oil-soluble component floats in the vicinity of the fluid surface due to a difference in specific gravity and the processing fluid 136 of the water-soluble component stays below the hydraulic fluid 152.

The machining tool system using the conventional NC lathe machine 100 illustrated in FIG. 2 has a configuration of performing two-fluid separation of the processing fluid 136 and the hydraulic fluid 152 such that only the processing fluid 136 can be pumped up and circulated from the suctioning flow path 138 and can be reused.

The processing fluid 136 with the hydraulic fluid 152 of the oil-soluble component mixed therein that has reached the first storage tank 134a enters and is stored in the region of the circle 1 first and then enters the region of the circle 2 from the region of the circle 1 by a partition 134c opened on the lower side (see the arrow α). At this time, the sludge 144 is precipitated at the bottom portion, the oil-soluble hydraulic fluid 152 forms a separation-floating or emulsification-floating layer in the vicinity of the fluid surface above the region of the circle 1, and the processing fluid 136 from which the content of the oil-soluble hydraulic fluid 152 has been significantly reduced is stored below the formed layer.

Therefore, the most part of the components of the fluid entering and stored in the region of the circle 2 is configured of the hydraulic fluid 136 that does not contain the oil-soluble hydraulic fluid 152. Also, the oil-soluble hydraulic fluid 152 separation-floating or emulsification-floating in the vicinity of the fluid surface above the region of the circle 1 is released from the discharge flow path 142 with an end portion on the suctioning side disposed in the vicinity of the fluid surface to the second storage tank 134b and is discarded to the outside. In this manner, two-fluid separation in a first stage of roughly separating the processing fluid 136 from the mixture fluid (containing the sludge 144) of the hydraulic fluid 152 and the processing fluid 136 is achieved.

Also, the processing fluid 136 in the region of the circle 1 crosses over a partition 134d with an upper end at a lower position than that of the partition 134c, enters the region of the circle 3 (see the arrow β), and enters the region of the circle 4 by a partition 134e having an upper end at a higher position than that of the partition 134d and opened on the lower side (see the arrow γ). In this manner, even if the oil-soluble hydraulic fluid 152 remains in the vicinity of the fluid surface above the region of the circle 2, the most part thereof is removed from the processing fluid 136 entering the region of the circle 4. Furthermore, the processing fluid 135 in the region of the circle 4 forms a circulating flow path through which the processing fluid 135 is pumped up from the suctioning port 138b disposed below the vicinity of the fluid surface and at a position that is higher than the bottom portion to the inside of the suctioning flow path 138 and is reused as a processing fluid. In this manner, two-fluid separation in a second stage of roughly separating the processing fluid 136 from the mixture fluid of the hydraulic fluid 152 and the processing fluid 136 is achieved.

Figure 5:
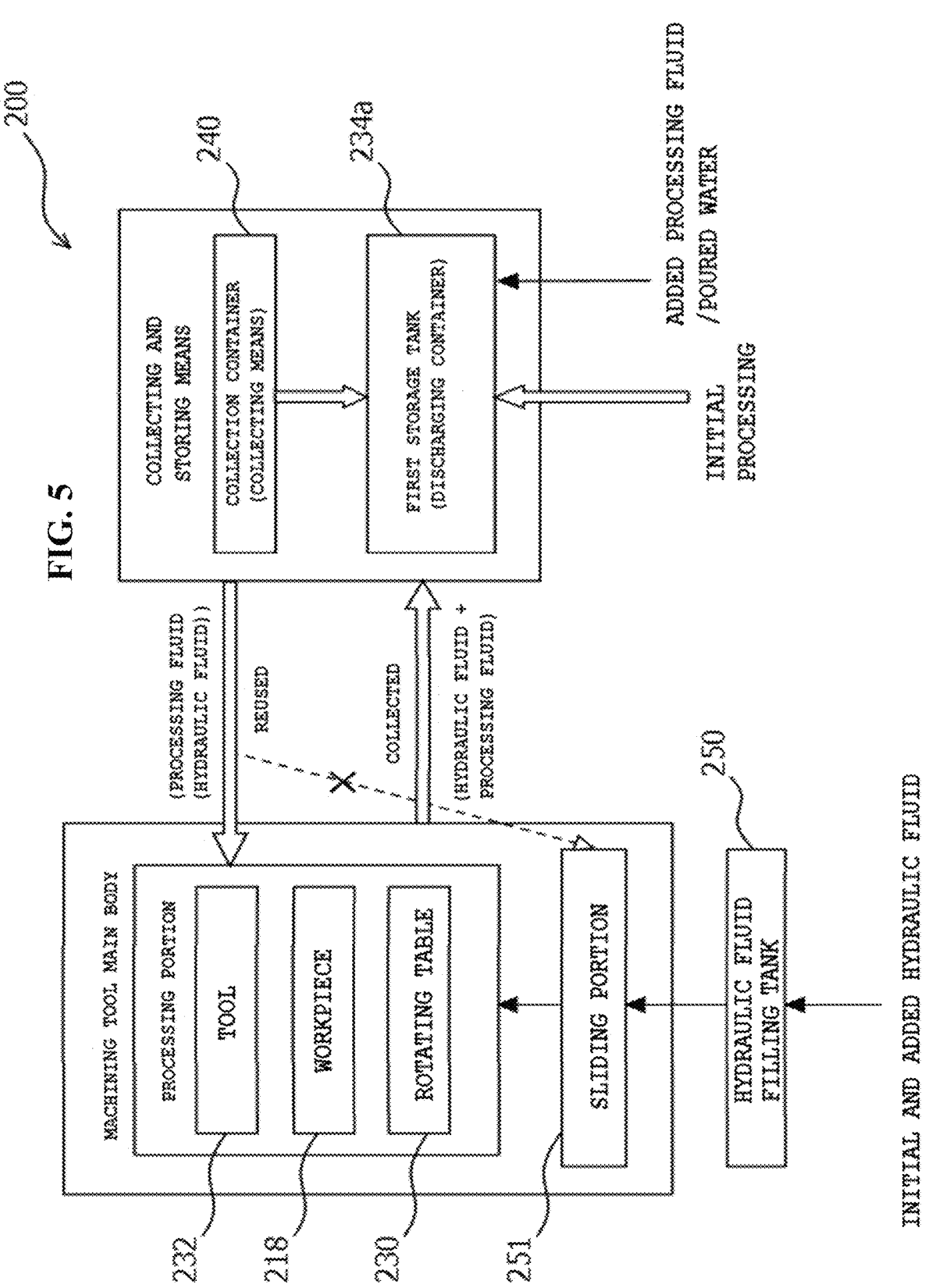
FIG. 5 is a block diagram illustrating a configuration example of the machining tool system according to the present invention in FIG. 4.

Example of Machining Tool System of Present Invention (See FIGS. 4 and 5)

Next, an example of supply flow paths of lubricating fluids in the machining tool system of the present invention will be described with reference to FIGS. 4 and 5. FIG. 4 illustrates a configuration example of the machining tool system of the present invention using an NC lathe machine 200, and FIG. 5 illustrates a block diagram illustrating an overview of the machining tool system of the present invention. Here, in order to illustrate that the machining tool system of the present invention can use the machining tool used in the machining tool system in the related art as it is, the NC lathe machine 200 with the same basic configuration as that of the NC lathe machine 100 illustrated in FIGS. 2 and 3 is used in FIGS. 4 and 5, and supply flow paths of lubricating fluids in the present machining tool system, particularly, configurations that are different from the configurations in FIGS. 2 and 3 will be described here. Note that in FIGS. 4 and 5, members with reference signs, the last two numbers and symbols of which are the same as the reference signs and symbols in FIGS. 2 and 3, are the same members or have the same functions as those in FIGS. 2 and 3. Also, the arrows illustrated in FIG. 5 illustrate flows of a processing fluid or a hydraulic fluid, and the thicknesses of the arrows reflect images of how large the flow amounts are similarly to FIG. 3.

According to the NC lathe machine 200 in the machining tool system of the present invention, from among the lubricating fluids, a base of a processing fluid used at the time of processing of a workpiece 218 with a tool 232 is a water-soluble material similarly to that in the related art, while the same water-soluble material (which will be described later in detail) as that of the processing fluid is used as a base of the hydraulic fluid used for sliding motion of a tool spindle 220 and lubrication of a sliding surface of a rotation shaft of a rotating table 230 in the present machining tool system. Also, the second storage tank 134b is not provided together with a first storage tank 234a as in the related art in the NC lathe machine 200.

First, as for the "processing fluid", a predetermined amount of new processing fluid 236 is poured into and stored in the first storage tank 234a in an initial state similarly to the example in the related art illustrated in FIGS. 2 and 3. Once the NC lathe machine 200 operates, the processing fluid 236 in the first storage tank 234a is pumped up and is released from a releasing port 238a to a processed part (see FIG. 5) in the vicinity of the workpiece 218 and the tool 232 via a suctioning flow path 238. The released processing fluid 236 performs lubrication and cooling of the processed part, then drops from the workpiece 218, the rotating table 230, and the like, and is entirely received and collected in a collection container (collecting means) 240.

Also, the collected processing fluid is returned from a discharge port 242a to inside of the first storage tank 234a via a discharge flow path 242 located downstream of the collection container 240, and is pumped up again to the inside of the suctioning flow path 238 from a suctioning port 238b located at a predetermined height such that sludge 244 that is precipitated at a bottom portion is not pumped up, and a reusing and circulating process of the processing fluid is thereby formed. Note that the reusing and circulating process of the processing fluid (or a hydraulic fluid, which will be described later) may have another flow path configuration as long as there is collecting and storing means (see FIG. 5) of the fluid after use downstream of the processed part, and there may be a case where the collection container 240 and the first storage tank 234a are directly connected to each other and a case where the processing fluid is pumped up from the collection container 140 once and is then transported to the inside of the first storage tank 234a, for example, similarly to the example in the related art illustrated in FIGS. 2 and 3. Hereinafter, once the processing fluid is poured into the first storage tank 234a at the beginning in the initial state, collecting and discarding processing of an oil-soluble component to the second storage tank 134b for two-fluid separation (for separation into oil and water) is not needed as in the machining tool system in the related art illustrated in FIGS. 2 and 3, and new processing fluid or dilution water is poured and added only at the time of addition corresponding to the amount of decrease or regular maintenance since the total amount of the processing fluid inside the system decreases only for reasons such as water content evaporation. Hereinafter the point that the process of separating the two fluids, namely the hydraulic fluid and the processing fluid is not needed will be described by illustrating examples of flow paths and components of the hydraulic oil.

First, as for the flow path of the "hydraulic fluid", since the hydraulic fluid contains an water-soluble material as a main component, and a closed space is generally filled with the hydraulic fluid, once a hydraulic fluid filling tank 250 is filled with a new hydraulic fluid 252 in the initial state, the refilling with a minute amount of hydraulic fluid 252 is performed corresponding to the amount of decrease caused by leakage. The hydraulic fluid 252 in the hydraulic fluid filling tank 250 is roughly split into a first hydraulic fluid supply path 254 on the side of the tool spindle 120 and a second hydraulic fluid supply path 256 on the side of the rotating table 230 and is supplied to the tool spindle 220 and a sliding portion (see FIG. 5) for sliding motion of the rotating table 230, respectively. Although the hydraulic fluid is supplied for the purpose of lubrication of a sliding motion component, and the hydraulic fluid is not released in large amount like the processing fluid as described above, a minute amount of hydraulic fluid is caused to leak to the outside of the sliding portion. The leaking hydraulic fluid 252 drops downward from the tool spindle 220, the tool 232, the rotating table 230, and the like, the most part thereof reaches the collection container 240 disposed for collecting the processing fluid 236, and the fluid in the collection container 240 is brought into a state where the hydraulic fluid 152 is mixed in the processing fluid 236.

However, since both the hydraulic fluid 152 and the processing fluid 236 contain the same water-soluble material as their components unlike the machining tool system in the related art, the mixture fluid of the hydraulic fluid and the processing fluid collected in the collection container 240 reaches the first storage tank 234a via the discharge flow path 242 as a fluid that does not contain oil-soluble components. Therefore, the hydraulic fluid 152 and the processing fluid 236 stored in the first storage tank 234a have the same quality as that of the processing fluid for the initial filling, except for the concentrations.

As a result, the two-fluid separation process as in the machining tool system in the related art illustrated in FIGS. 2 and 3 is not needed, and it is possible to circulate the hydraulic fluid 252 and the processing fluid 236 collected and stored as described above to the processed part as they are and to reuse the hydraulic fluid 252 and the processing fluid 236. The machining tool system is advantageous in various aspects as described above. Note that in the example of the machining tool system of the present invention in FIGS. 4 and 5, the mixture fluid of the hydraulic fluid 252 and the processing fluid 236 stored in the first storage tank 234a is not reused and recycled as a hydraulic fluid since sludge 244 that has been precipitated remains in the first storage tank 234a (see the arrows in FIG. 5).

Composition Examples of Processing Fluid and Hydraulic Fluid

Hereinafter, compositions and blending ratios of the hydraulic fluid 252 and the processing fluid 236, effective utilization of which in the machining tool system in FIGS. 3 and 4 has been verified, will be described.

Preferred compositions (and blending ratios) of the hydraulic fluid 252 and the processing fluid 236 as undiluted solutions shown in (i) to (vi) below were verified.

(i) Alkaline agent (10% to 20%)

(ii) Fatty acid (10% to 20%)

(iii) Polymer (3% to 15%)

(iv) Alkaline electrolyzed water (remaining part of other compositions)

(v) Anticorrosion agent if added (0.1% to 0.2%)

(vi) Antifoaming agent if added (0.1% to 0.2%)

(i) The alkaline agent is, for example, amines and is contained for the purpose of maintaining high pH to prevent acidification of the fluids. Adjustment of pH will be mentioned in the description of (iv) Alkaline electrolyzed water below.

(ii) The fatty acid is blended to secure lubricity. Although a typically corresponding fatty acid has 8 to 18 carbon atoms, a fatty acid having 9 or 10 carbon atoms, for example, a straight-chain saturated fatty acid such as a nonanoic acid or a decanoic acid, a straight-chain unsaturated fatty acid such as an undecylenic acid, a branched saturated fatty acid such as an isononanoic acid or a versatic acid, or a dibasic acid such as a sebacic acid is preferable in a case where the fatty acid is used for the hydraulic fluid and the processing fluid of the machining tool system of the present invention, from the viewpoint of letting a user visually and tactually recognize that the fatty acid is water-soluble and contributing to promotion of the decarbonized society. Note that in order to make (ii) a higher fatty acid water-soluble, a salt is formed from (i) the alkaline agent and (ii) the higher fatty acid.

(iii) The polymer is blended for the purpose of securing viscosity of the hydraulic fluid, and examples thereof include a polymer of ethylene oxide or propylene oxide or butylene oxide and polyalkylene glycol which is a copolymer of ethylene oxide and propylene oxide. An average molecular weight of polyalkylene glycol preferably falls within a range of 400 to 4500, and one kind thereof includes an N atom in its structure, and another kind thereof includes butylene glycol. An average molecular weight of butylene glycol is preferably 400 to 500.

(iv) The alkaline electrolyzed water is alkaline water that is obtained using potassium carbonate as an electrolyte and containing potassium hydroxide, for example, a strong alkaline undiluted solution of pH 10.0 to 12.5 is input as it is for the hydraulic fluid from the viewpoint of securing lubricity, and the undiluted solution is further diluted with (iv) the weak alkaline electrolyzed water by about 3 to 20 times, or more preferably about 5 to 10 times and is then input for the processing fluid. Since a surface of a metal member such as stainless steel constituting the machining tool is finished and a passive film is formed thereon from the viewpoint of preventing rust and the like, and there is a likelihood that the passive film may be dissolved if the large amount of released processing fluid is acidified, adjustment and management to keep a week alkaline level of preferably $pH \geq 7.0+0.2=7.2$ in addition to (i) the alkaline agent and water addition. Also, if the processing fluid becomes excessively strong alkaline, there is a likelihood that the workpiece 218 may be dissolved in a case where the workpiece 218 is non-iron metal such as Al, the material of the workpiece that is a target of processing is limited, and it is thus preferable to perform adjustment to meet pH<10.5.

Therefore, the blending of (i) the alkaline agent is adjusted, and blending is performed to meet preferably $7.2 \leq pH < 10.5$, or in consideration of versatility, pH=about $8.1 \pm 0.2$ in the initial state at the time of filling. Note that the amount of hydraulic fluid leaking and mixed with the processing fluid is much smaller than the processing fluid, the hydraulic fluid does not significantly affect pH of the processing fluid, in particular, and there were no problems at all in preferred continuous operation of the machining tool system as long as the environment in which the undiluted solution is appropriately diluted with the alkaline electrolyzed water continues even when the strong alkaline undiluted solution is used to maintain viscosity given by the polymer.

(v) The anticorrosion agent which is suitable for non-iron metal such as copper, zinc, or aluminum, for example, is used, and as (vi) the antifoaming agent, a silicone-based antifoaming agent is used. Both are added as desired in accordance with the constituent material of the machining tool and blending of (i) to (iv) described above.

In regard to the hydraulic fluid and the processing fluid containing the aforementioned water-soluble material, preferred continuous operations of the exemplary machining tool system (FIGS. 4 and 5) of the present invention has been verified in a case where the horizontal NC lathe machine 10 in FIG. 1 and the vertical NC lathe machine 200 in FIG. 3 as described above are used for the machining tool system of the present invention.

Therefore, those skilled in the art will be able to understand that according to the machining tool system of the present invention, it is possible to use a water-soluble material that does not contain oil-soluble materials derived from mineral oils both as a hydraulic fluid and a processing fluid for a machining tool and to reuse and circulate the processing fluid without two-fluid separation. Note that the embodiment illustrated in the present specification and the drawings is an example of the present invention, and it is obvious for those skilled in the art that there may be other various improved examples and modification examples from the idea and the teaching of the claims.

REFERENCE SIGNS LIST

10 Horizontal NC lathe machine
100, 200 Vertical NC lathe machine
12 Mount
14 Spindle (C1 shaft)
16 Spindle (C2 shaft)
18, 118, 218 Workpiece
20, 120, 220 Tool spindle
22 Lower bed
24 Upper bed
26, 126 Spindle base
130, 230 Rotating table
123, 232 Tool
134 Storage tank
134a, 234a First storage tank (discharging container)
134b Second storage tank
136, 236 Processing fluid
138, 238 Suctioning flow path
138a, 238a Releasing port
138b, 238b Suctioning port
140, 240 Collection container (collecting means)
142 Discharge flow path
142a Discharge port
143 Discarding flow path
144, 244 Sludge
146 Discarding flow path
150, 250 Hydraulic fluid filling tank
151, 251 Sliding portion
152, 252 Hydraulic fluid
154, 254 First hydraulic fluid supply path
156, 256 Second hydraulic fluid supply path

The invention claimed is:

1. A machining tool system including a machining tool configured to operate in an environment in which a hydraulic fluid and a processing fluid used to process a processed member with the machining tool are mixed, the machining tool system comprising:

a collecting means including a collection container for collecting the hydraulic fluid and the processing fluid after a lubricating effect ends in a mixed manner, the collecting means being disposed downstream of a lubricating flow path of the machining tool;

a discharging container that communicates with the collecting means through a discharging flow path and stores the hydraulic fluid and the processing fluid in a mixed state; and a circulating means including a pump and an inlet port disposed in the discharging container at a predetermined height above a bottom portion of the discharging container for directly suctioning the hydraulic fluid and the processing fluid stored in the discharging container without separating the hydraulic fluid and the processing fluid into oil and water, and returning the hydraulic fluid and the processing fluid for reuse through a suctioning flow path to a supply flow path of the processing fluid, while blocking communication with a supply flow path of the hydraulic fluid.

2. The machining tool system according to claim 1, wherein the supply flow path through which the circulating means returns the hydraulic fluid and the processing fluid from inside the discharging container is the supply flow path for the processing fluid and blocks communication with the supply flow path for the hydraulic fluid.

3. The machining tool system according to claim 1, wherein for processing of the processed member, a lathe function, a milling function, a grinding function, a drilling function, or a saw cutting function is included.

4. The machining tool system according to claim 1,
wherein each of the hydraulic fluid and the processing fluid contains a water-soluble material and does not contain an oil-soluble material derived from a mineral, and
wherein each of the hydraulic fluid and the processing fluid does not contain an anticorrosion agent, and a pH buffer agent is blended in each of the hydraulic fluid and the processing fluid.

5. The machining tool system according to claim 2, wherein for processing of the processed member, a lathe function, a milling function, a grinding function, a drilling function, or a saw cutting function is included.

6. The machining tool system according to claim 2,
wherein each of the hydraulic fluid and the processing fluid contains a water-soluble material and does not contain an oil-soluble material derived from a mineral, and
wherein each of the hydraulic fluid and the processing fluid does not contain an anticorrosion agent, and a pH buffer agent is blended in each of the hydraulic fluid and the processing fluid.

7. The machining tool system according to claim 3,
wherein each of the hydraulic fluid and the processing fluid contains a water-soluble material and does not contain an oil-soluble material derived from a mineral, and
wherein each of the hydraulic fluid and the processing fluid does not contain an anticorrosion agent, and a pH buffer agent is blended in each of the hydraulic fluid and the processing fluid.

* * * * *